UNITED STATES PATENT OFFICE.

HENRY JAS. LIVINGSTON, OF BALTIMORE, MARYLAND.

COMPOSITION FOR MAKING CARBONATED HYDRAULIC LIME, CEMENT, OR MORTAR.

SPECIFICATION forming part of Letters Patent No. 620,155, dated February 28, 1899.

Application filed March 18, 1898. Serial No. 674,325. (No specimens.)

*To all whom it may concern:*

Be it known that I, HENRY JAMES LIVINGSTON, a British subject, residing at the Hotel Baltimore, in the city of Baltimore, State of Maryland, have invented a new and useful composition of matter to be used with hydraulic lime or cement, or with cement, cinder, or clinker, so as to resemble waste-iron slag, only without the objectionable excess of sulfur and magnesia present in the latter, for the purpose of making carbonated hydraulic lime, cement, or mortar, of which the following is a specification.

My composition consists of, by weight, hydrate of lime, one hundred parts; carbon, preferably coke, thirty to forty parts; saccharine or farinaceous matter, preferably sugar, one part, all in a fine state of reduction. Ten to one hundred parts of this composition are to be thoroughly incorporated with one hundred parts of hydraulic lime or cement or of cement, cinder, or clinker, as above, and a mortar more plastic, stronger, if desired, and cheaper than the mortar from the original lime, cement, or cement-cinder is produced. The strength will vary, say, from ten per cent. over to fifteen per cent. under that of the original hydraulic lime or cement, according to the quantity of composition added—say from ten per cent. over to fifteen per cent. under that of the original lime, cement, or cement, cinder, or clinker.

I find that the union of carbon and saccharine or farinaceous matter with lime induces a rapid chemical combination of lime and carbon and carbonic acid. With the addition of saccharine matter, preferably in a very fine state, to the hydrate of lime and finely-ground carbon I find a chemical combination of carbon with lime and oxygen is begun as soon as water is mixed with the composition, as above, and with the hydraulic lime or cement and increases rapidly.

I am aware that coke is sometimes used as an aggregate in concrete and that in some hydraulic cements sugar may be used advantageously as a retarder; but I am not aware that the ingredients of my composition have been used together.

What I claim, and desire to secure by Letters Patent of the United States, is—

A composition consisting of, by weight, hydrate of lime, one hundred parts; carbon, preferably coke, thirty to forty parts; saccharine or farinaceous matter, preferably sugar, one part, for the purpose specified and substantially as described.

March 18, 1898.

HENRY JAS. LIVINGSTON.

Witnesses:
JAMES H. ALFORD,
THOS. CUMMISKEY.